July 1, 1958
N. E. LINDENBLAD
2,841,323
ADSORPTION PUMPING
Filed Nov. 19, 1954
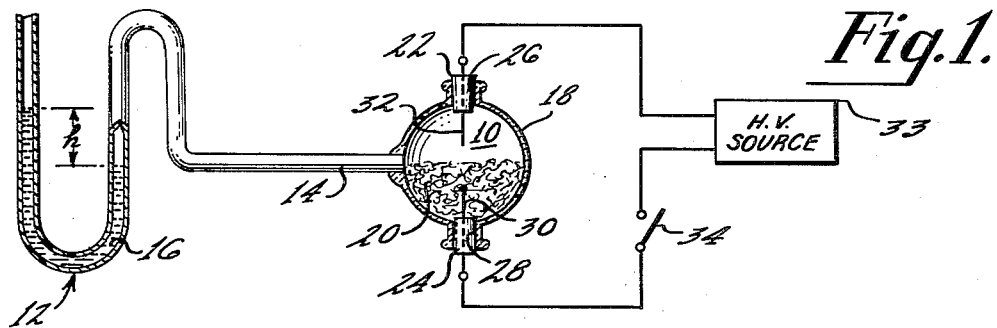
*Fig.1.*
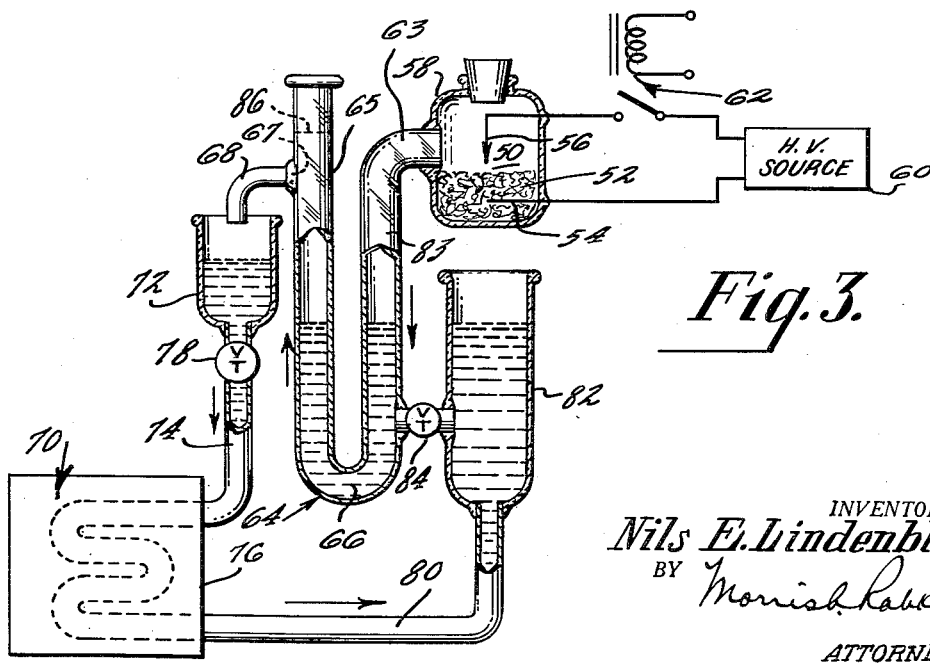
INVENTOR.
*Nils E. Lindenblad*
BY
ATTORNEY.

United States Patent Office 2,841,323
Patented July 1, 1958

2,841,323

ADSORPTION PUMPING

Nils E. Lindenblad, Princeton, N. J., assignor to Radio Corporation of America, a corporation of Delaware Application November 19, 1954, Serial No. 469,896

6 Claims. (Cl. 230—69)

This invention relates to methods and apparatus for changing the pressure of an enclosed gas, and more particularly to a method and apparatus for producing such changes by electronic means.

The pressure of a gas in an enclosed system may be changed by known methods such as changing its temperature or changing its volume. The invention to be herein described provides a novel method of and apparatus for changing the pressure of an enclosed gas directly by electronic means.

An object of this invention is to provide an electronic method for producing a change in the pressure of an enclosed gas.

Another object is to provide an apparatus for electronically changing the pressure of an enclosed gas.

A further object is to provide an electronic pump operating in accordance with aforementioned phenomenon.

In accordance with the method taught by this invention a portion of the gas within an enclosed system is adsorbed on the surface of an adsorbing material disposed within the system. An electronic agency is applied to the material to produce a change in its adsorbing characteristics. According to the effect of the electronic agency on the material, gas is either adsorbed or released from its surface. This accordingly decreases and increases the pressure within the system. The electronic agency is of a character which decreases the adsorbing ability of the adsorbing medium. Application of this agency, therefore, releases gas from the adsorbing medium to increase the pressure within the system.

Other objects and advantages of the present invention will become apparent to one skilled in the art from a reading of the following description in conjunction with the accompanying drawing, in which:

Fig. 1 is a schematic diagram of one illustrative embodiment of this invention;

Fig. 2 is a schematic diagram of another illustrative embodiment of this invention; and Fig. 3 is a schematic diagram of still another illustrative embodiment of this invention.

In Fig. 1 a device is shown for changing the pressure of a gas in an enclosed system by electronic means. A fluid tight enclosure 10 is connected to a U-tube manometer 12 by means of a conduit 14. The manometer 12 has a fluid 16 to seal the system from the surrounding atmosphere and to provide a means for measuring or indicating changes of pressure within the system. The walls 18 of the enclosure 10 are made of material which does not conduct an electric current, for example glass, which is sufficiently strong to withstand the changes in pressure.

A gas adsorbing medium 20 occupies a portion of the space within the enclosure. The adsorbing medium has a high ratio of surface area to mass. Its adsorbing ability is, therefore, high. A material having these characteristics may be, for example, steel wool.

Means are provided for applying an electronic agency to the adsorbing medium to change its adsorbing characteristics. This means is a pair of electrodes 30 and 32 inserted within the chamber 10. These electrodes are inserted within the chamber through plugs 22 and 24 which seal apertures 26 and 28 in the wall 18 of the chamber 10. The electrode 30 is inserted through plug 24 and is electrically connected to the steel wool 20 within the chamber. The electrode 32 in the form of a corona discharge point is inserted through plug 22. Plugs 22 and 24 are made of insulating material. They may be, for example, made of rubber. The electrodes are connected across a source 33 of high potential. A switch 34 is provided for opening and closing the circuit. A gas, for example, air is sealed within the chamber by means of the seal provided by the liquid 16 within the manometer.

When the switch 34 is closed, a high potential, for example 12,000 volts, is imposed across the electrodes. A corona discharge is created. A stream of ions from the discharge point 32 impinges upon or bombards the steel wool 20. This changes the adsorbing characteristics of the steel wool. It is no longer able to hold the quantity of originally adsorbed gas. The gas is released from the surface of the steel wool and raises the pressure within the chamber. This change in pressure is transmitted through the conduit 14 to the manometer 12. This causes the change in pressure indicated by the difference in height of the column designated by "$h$." As the switch is opened and closed to control the corona discharge, the pressure within the chamber decreases and increases. Pressure heads "$h$" of from six to twenty inches of water have been produced with approximately 12,000 volts applied.

The means, herein described, for applying an electronic agency is a corona discharge means providing a stream of ions. Other means of providing streams of ions or charged particles may be used within the spirit of this invention.

In Fig. 2, a schematic diagram of a pump is shown which operates in accordance with the phenomenon described in conjunction with Fig. 1. Parts of Fig. 2 identical to parts in Fig. 1 are designated by the same reference characters followed by the suffix "$a$." A chamber 10$a$ is shown including electrodes 30$a$ and 32$a$ inserted through plugs 22$a$ and 24$a$ into the chamber. The electrode 30$a$ is electrically connected to the adsorbing steel wool 20$a$ within the chamber. The chamber walls 18$a$ are made of an insulating material, for example, glass. A source of high voltage 33$a$ capable of applying 12,000 volts, for example, is connected across the electrodes. A switch 34$a$ is provided for controlling the imposition of this high voltage across the electrodes.

The chamber has an inlet 40 and an outlet 42 so that a flow of gas may be pumped through the chamber. The inlet and outlet are herein shown connected to the atmosphere. The atmosphere, therefore, is both a source of gas and a receiver of the gas. The inlet and outlet, however, may be connected to a separate source and a separate receiver. A check valve 44 is connected by hose 45 to the inlet 40 of the chamber so that gas flows only into the chamber. Another check valve 46 is connected to the outlet 42 of the chamber by a hose 47 to provide a means for allowing gas to be discharged from the chamber. The direction of gas flow through each check valve is indicated by an arrow.

Each of the check valves resembles a manometer. Each of the check valves has one leg of relatively small cross section and the other leg of large cross section. The relatively large cross section leg of valve 44 is connected to the inlet of the chamber while the relatively small cross section leg of the other valve 46 is connected to the outlet of the chamber. Valves 44 and 46 are herein shown as inclined reservoirs 49 and 51 with respective flooded inlets 53 and 55 of smaller cross section than their bodies or reservoirs 49 and 51. This provides a compact valve with high ratio of cross sections and negligible unused air space. Vertical U-tubes having legs of varying cross section may also be used.

As the pressure within the chamber 10a pulsates with the opening and closing of switch 34a, the check valves 44 and 46 permit gas or air to flow through the pump in the indicated direction. The pressure built up within the chamber 10a forces all the liquid out of the smaller cross section leg 55 of valve 46. Air then bubbles up through the liquid in the body 51 of valve 46 and passes through it. The increase in pressure within the chamber, however, has a sealing effect upon the larger cross section leg formed by the body 49 of the other valve 44. The pressure causes the fluid to rise a considerable distance in the smaller cross section leg 53.

Application of pressure to the larger cross-sectional leg, therefore, seals the smaller leg. On the other hand application of pressure to the smaller cross section leg 55 forces the relatively small amount of fluid from the smaller leg 55 into the larger leg formed by body 51 where it is stored. This allows the air under pressure to bubble through liquid in the larger leg formed by body 51. When the pressure in the chamber 10a decreases, it drops below atmospheric pressure. The atmospheric pressure forces the liquid down out of leg 53 of valve 44 into reservoir 49. The air then bubbles through the liquid in the reservoir 49 into chamber 10a. When the pressure in the chamber 10a increases, the air is forced out through valve 46, as previously described. Air, therefore, flows through the valves only in the direction from the smaller cross section leg to the larger. Valves 44 and 46, therefore, act as one-way valves or check valves.

As the switch 34a is opened and closed, the pressure of air within the chamber 10a respectively increases and decreases. This causes an intermittent flow of air into valve 44, through chamber 10a and out through valve 46. A one-way flow of gas is thereby provided in response to application of an electronic agency.

In Fig. 3 is shown a schematic diagram of a liquid pump operating in accordance with this invention. A fluid tight chamber 50 is provided. An adsorbing material 52, for example steel wool, adsorbs gas within this chamber. This gas, for example, may be air. A pair of electrodes 54 and 56 are passed through the wall 58 of the chamber. The wall 58 of the chamber 50 is made of an insulating material, for example, glass to prevent short circuiting of the electrodes. The electrode 54 is electrically connected to the steel wool 52 in the chamber. The electrode 56 is a corona discharge point and is disposed at a corona forming distance from the material 52. The electrodes are connected in circuit with a high potential source 60. This high potential source may be, for example, be capable of applying 12,000 volts. A relay 62 is provided for intermittently energizing and deenergizing the discharge points. The relay 62 may be of any known type energized from an intermittent power source (not shown). The relay may be intermittently actuated at a suitable frequency, for example, 10 cycles per minute.

The chamber 50 has an outlet conduit 63. This conduit connects the chamber 50 with a U-tube 64. A liquid 66, for example water, lies within the U-tube. The leg 65 of the U-tube 64 remote from the chamber 50 has an overflow means at a point higher than the normal level of the fluid. This overflow means may be the spout 68 connected to an outlet 67 in the column 65. A fluid circulating system 70 is supplied by fluid spilled through the spout 68. It has an inlet, for example, funnel 72 for receiving and storing fluid discharged from the U-tube. A conduit 74 channels this fluid through a device 76 where it performs a useful function. The device 76 may be, for example, a heat exchanger. A throttling valve 78 is provided below the funnel for providing a steady flow of fluid to the circulating system 70. A conduit 80 connects the circulating system 70 with a reservoir 82. This reservoir 82 communicates with the leg 83 of the U-tube. It is connected through a throttling valve 84 which allows fluid to build up a head in the reservoir to cause the fluid to flow into the leg.

When the relay 62 intermittently opens and closes its contacts, the gas within the chamber 50 is absorbed and released from the steel wool 52 within the chamber. This accordingly decreases and increases the pressure of the gas enclosed within the system.

As the pressure increases, it acts upon the fluid within the U-tube or manometer in a direction to raise the level in the leg 65 remote from the chamber. The level in the leg 65 is raised to a level indicated by the broken line 86. This level is above the overflow outlet 67. Fluid, therefore, flows into the funnel 72 where it is stored above the level of fluid in the manometer when the high voltage is interrupted. This fluid then flows by gravity through the circulating system 70 into the reservoir 82. As the level of fluid in the reservoir 82 rises above the level of fluid in the U-tube 64, it flows through throttle valve 84 into the U-tube leg 83. A steady flow of fluid is, therefore, returned to the U-tube. The intermittent application of high voltage provides a pulsating flow of fluid into the funnel. The funnel stores this fluid and provides a steady flow of fluid to the system.

What is claimed is:

1. In a pumping apparatus, the combination comprising means for providing a gas tight chamber, a gas in said chamber, means disposed within said chamber for adsorbing said gas, means disposed within said chamber for applying an electronic agency to said adsorbing means to produce a change in its adsorbing characteristics, and means for controlling said means disposed within said chamber for providing said electronic agency to cause said agency providing means to reduce the adsorbing characteristics of said adsorbing means to increase the pressure within said chamber and to increase the adsorbing characteristics of said adsorbing means to reduce the pressure within said chamber.

2. An electronic pump comprising means for providing a gas tight chamber, a gas disposed within said chamber, and adsorbing means disposed within said chamber, said chamber having an inlet and an outlet, one-way valves connected to said inlet and said outlet in a direction to permit a flow through said chamber into said inlet and out of said outlet, means disposed within said chamber for producing a change in the adsorbing characteristics of said adsorbing means, and means for intermittently actuating said change producing means to intermittently increase and decrease the pressure within said chamber to produce a pulsating flow of gas through said chamber.

3. An electronic fluid pump comprising means for providing a gas tight chamber, a gas disposed within said chamber, an adsorbing medium disposed within said chamber, means for producing a change in the adsorbing characteristics of said medium disposed within said chamber whereby to increase and decrease the adsorbing characteristics of said material to accordingly decrease and increase the gas pressure within said chamber, a U-tube connected to said chamber, a fluid to be pumped disposed within said U-tube, said U-tube including an overflow means disposed above the normal level of said fluid in said U-tube, a system to be supplied with fluid having means disposed under said overflow means to receive fluid flowing through said overflow means, means for controlling said change producing means to produce a change in differential pressure in said U-tube to cause said fluid to change its level thereby causing a portion of said fluid within said U-tube to spill over through said overflow means to said system, and a reservoir connected to said system and to said U-tube to receive said fluid after it flows through said system, and means to return said fluid in said reservoir to said U-tube.

4. In a pumping apparatus, the combination comprising means providing a gas tight chamber, a gas disposed within said chamber, means disposed within said chamber for adsorbing said gas, ion producing means disposed within said chamber for applying a stream of ions to said adsorbing means, and means for actuating said ion producing means to apply said stream of ions to said adsorbing means to increase the pressure within said chamber.

5. A pump comprising means providing a gas tight chamber having an inlet and an outlet, means disposed within said chamber for adsorbing a gas, ion producing means disposed within said chamber for reducing the adsorbing capacity of said adsorbing means to increase the pressure within said chamber, a first manometer including a liquid, said first manometer having two legs, one of said legs being of larger cross-sectional area than the other, said leg of larger cross-sectional area being connected to said inlet, said leg of smaller cross-sectional area being connected to a source of gas, a second manometer including a liquid, said second manometer having two legs, one of said legs of said second manometer being of larger cross-sectional area than the other, said leg of smaller cross-sectional area of said second manometer being connected to said outlet, a receiver of gas, said leg of larger cross-sectional area of said second manometer being connected to said receiver of gas, and means for controlling said ion producing means to periodically decrease and increase the pressure within said chamber, said controlling means decreasing the pressure within said chamber to cause gas to flow from said source through said first mentioned manometer and through said inlet into said chamber and said controlling means increasing the pressure within said chamber to cause said gas to flow from said chamber outlet through said second manometer into said receiver of said gas.

6. In a pumping apparatus, the combination comprising an enclosure, a gas disposed in said enclosure, a medium in said enclosure for adsorbing a quantity of said gas to reduce the pressure within said enclosure, and means for releasing electrically charged particles onto said medium to release a portion of said adsorbed quantity of said gas to increase the pressure within said enclosure.

References Cited in the file of this patent

UNITED STATES PATENTS

| | | |
|---|---|---|
| 1,076,949 | Caldwell | Oct. 28, 1913 |
| 1,617,174 | Smith | Feb. 8, 1927 |
| 2,271,307 | Ray | Jan. 27, 1942 |